United States Patent [19]

Pitre

[11] Patent Number: 4,928,422

[45] Date of Patent: May 29, 1990

[54] ARTIFICIAL BAIT CRAB-LIKE FISHING LURE

[76] Inventor: Michael G. Pitre, 309 E. 85th St., Cut Off, La. 70345

[21] Appl. No.: 421,908

[22] Filed: Oct. 16, 1989

[51] Int. Cl.[5] ............ A01K 85/00

[52] U.S. Cl. ............ 43/42

[58] Field of Search ............ 43/42, 42.24, 42.26, 43/42.28, 42.46, 17.6, 42.15, 42.34

[56] References Cited

U.S. PATENT DOCUMENTS

| | | | |
|---|---|---|---|
| D. 121,694 | 7/1940 | Nichols . | |
| D. 122,028 | 8/1940 | Phelps . | |
| D. 163,073 | 7/1951 | Smith . | |
| D. 243,176 | 1/1977 | Carver . | |
| 2,218,280 | 10/1940 | Deering . | |
| 2,303,097 | 11/1942 | Townsend et al. . | |
| 2,718,033 | 9/1955 | Burke . | |
| 2,718,668 | 9/1955 | Burke . | |
| 2,999,331 | 6/1959 | Northup | 43/42.46 |
| 3,105,317 | 10/1963 | Fox . | |
| 3,377,734 | 12/1964 | Snow | 43/42.24 |
| 3,389,490 | 7/1965 | Peters | 43/42.26 |
| 3,438,144 | 4/1969 | Lincoln . | |
| 4,516,352 | 5/1985 | Firmin | 43/42.26 |
| 4,530,179 | 7/1985 | Larew | 43/42.24 |

OTHER PUBLICATIONS

Bass Pro Shops 1986 Catalog, p. 157, "The Crawdad".

*Primary Examiner*—M. Jordan

*Attorney, Agent, or Firm*—A. Robert Theibault

[57] ABSTRACT

In accordance with my invention I provide a molded crab-like artificial lure, legless and weighted toward one end. A line attaching eye is attached to the upper side at one end and a hook is attached to the underside at the other end. The buoyant material in the construction of the lure body will cause the lure to surface when retrieval of the attached line is stopped. In one embodiment of the lure employing a bill-like projection forming a planing surface which causes the lure body to dive and which due to the light weight buoyant material will cause the lure to surface when retrieval of the fishing line is stopped.

6 Claims, 2 Drawing Sheets

17
18
10
14
20

ARTIFICIAL BAIT CRAB-LIKE FISHING LURE

TECHNICAL FIELD

My invention relates to an ARTIFICIAL BAIT OR FISHING LURE resembling a crab and which behaves simular to a crab when being drawn through the water on a fishing line.

BACKGROUND ART

The most pertinent art known to me at the time of filing this application are the following U.S. Pat. Nos.:
DES. 121,694, of July 30, 1940, to Fred E. Nichols;
DES. 122,028, of Aug. 20, 1940, to Floyd A. Phelps;
2,218,280, of Oct. 15, 1940, to David N. Deering;
2,303,097, of Nov. 24, 1942, to J. R. Townsend, etal;
DES. 163,973, of July 17, 1951, to Hubert R. Smith;
2,718,033 of Sept. 20, 1955, to C. I. Burke;
2,718,668, of Sept. 27, 1955, to C. I. Burke;
3,105,317, of Oct. 1, 1963, to R. L. Fox;
3,438,144, of Apr. 15, 1969, to D. A. Lincoln;
DES. 243,176, of Jan. 25, 1977 to R. G. Carver.

DISCLOSURE OF THE INVENTION

In accordance with my invention I provide a molded crab-like artificial lure, legless and weighted toward one end. A line attaching eye is attached to the upper side at one end and a hook is attached to the underside at the other end. The buoyant material in the construction of the lure body will cause the lure to surface when retrieval of the attached line is stopped. In one embodiment of the lure employing a bill-like projection forming a planing surface which causes the lure body to dive and which due to the light weight buoyant material will cause the lure to surface when retrieval of the fishing line is stopped. In the embodiment not having the forward drafting bill to which the reel in line is attached a weight may be placed in the lure body forward of its centerline of draft.

The outline of the lure body is in that of a crab without legs. The underside of the body is outlined with the anatomical structure of a crab.

THE BEST MODE FOR CARRYING OUT THE INVENTION

Figure 1:
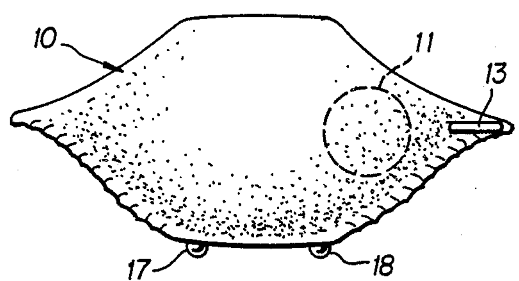
FIG. 1, is a top plan view of my crab-like artifical bait of fishing lure.
Figure 2:
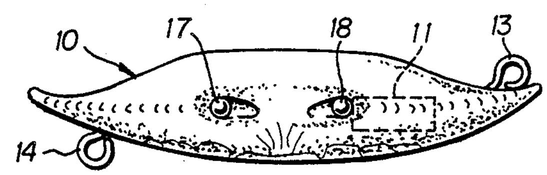
FIG. 2, is a front elevational view of the embodiment of my lure shown in FIG. 1.
Figure 3:
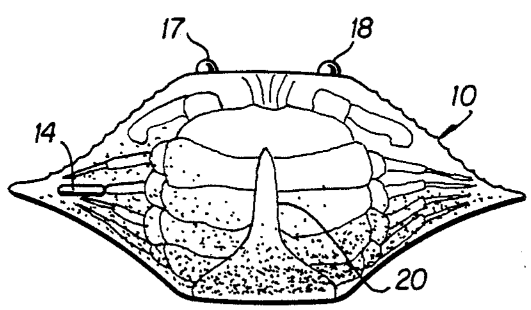
FIG. 3, is a bottom plan view of the embodiment of my lure shown in FIG. 1.
Figure 4:
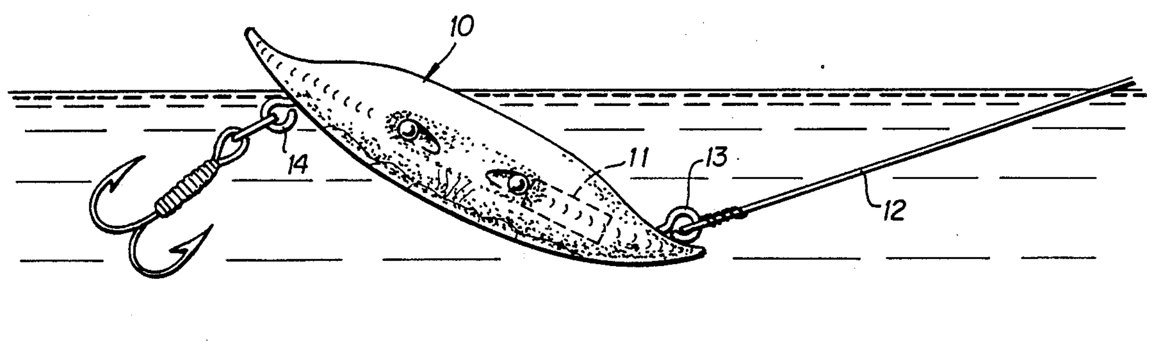
FIG. 4, is a front elevational view of the lure of FIG. 1 being under retrieval and having a rear hook.

Referring now to FIGS. 1 through 4, 10 designates a buoyant artificial bait body in the shape of a legless, clawless crab made of either wood or plastic having an at rest state of buoyancy permitting the crab to float. A disc-like weight 11, as shown in FIG. 4, is placed in the crab body which causes the body to tilt forwardly when the reel in line 12 is attached to the line eye 13. At the rear of the crab body 10 as best seen in FIGS. 2 and 4 attaching eyes 13 and 14 are screwed into the lure body 10 for securing the reel in eye 13 at one end of the lure 10 and a hook attaching eye 14 at the other end of the body.

Figure 5:
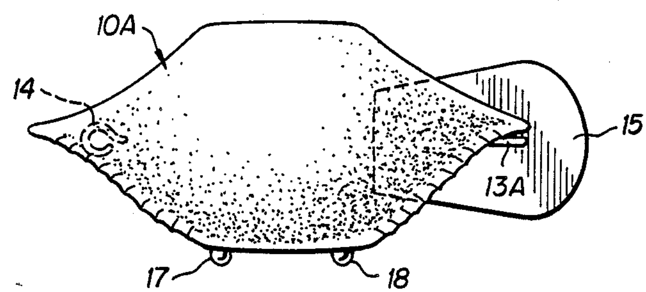
FIG. 5, is a top plan view of a modified form of my lure having a drafting and planing bill at the front end thereof.
Figure 6:
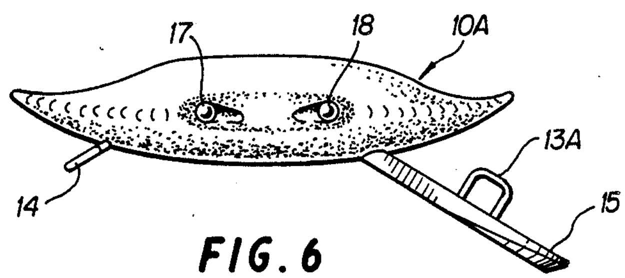
FIG. 6, is a front elevational view of my modified form of lure shown in FIG. 5.
Figure 7:
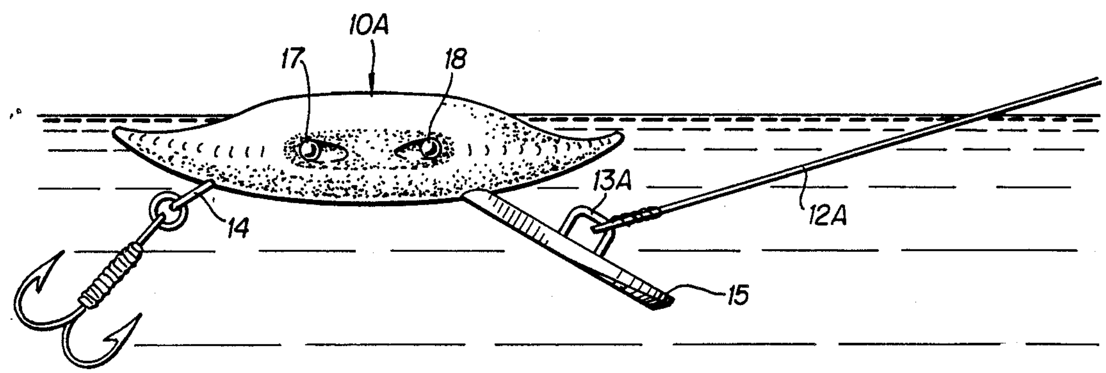
FIG. 7, is a front elevational view of the lure of FIG. 6 in an at rest position with no takeup on the retrieval line and the lure at rest.

Referring now to FIGS. 5, 6 and 7 a modified form of crab lure is shown in which the crab body 10A has a bill or bow plane 15 extending from within the crab body. A reel line attaching eye 13A is secured to the top of the plane 15 and a reel in line 12A is secured to the attaching eye 13A at 16, best seen in FIG. 7.

Referring to FIGS. 1 through 4, the lure is made of wood, but could also be made of plastic with the use of molds or other construction materials. The shape of the crab is that of the blue crab. Crab 10 floats on an angle because it has a weight embedded in the body which is located off center as shown in FIG. 1. The weight plus the angle of the lure 10 at rest play roles in the lure's ability to dive below the surface. The screw eyelets 13 and 14 are placed as best seen in FIG. 2 in the body for line and hook attachments. Rubber material is used on the hook to make the crab appear as if it has legs. Beaded pins 17 and 18 may be employed for eyes. When the line is cranked, or the rod is twitched, the lure will dive. If the retrieve is stopped the lure will surface. With crab 10, different actions of the lure can be obtained by the fisherman. When cranking the reel on a steady retrieve, the lure will mimic the natural swimming action of a live crab. With twitches of the rod, the crab can be made to go side to side like an injured crab.

Materials used in the construction of crab 10A of FIG. 1 is the same as those used in crab 10B shown in FIGS. 5, 6 and 7. The differences in the two are as follows: (1) There is no weight in crab 10B to help it dive. (2) There is a plastic bill or bow plane 15 attached to the end of the crab where the line is tied to the lure. This bill brings the lure below the surface and will keep it down until the reel is no longer cranked. Different shapes and lengths of plastic bill can be used to make the crab vary in diving ranges. The lure sits in a level position when at rest, as shown in FIG. 7.

As best seen in FIG. 3 the underside of the lure is lined at 20 to resemble the anatomy of a real crab.

What I claim is:

1. An artificial bait crablike fishing lure comprising an anatomical outline on the lure underside resembling the underside of a real crab, and thereby being a legless, clawless bouyant wood crab body having upwardly tappered front and rear ends, a line securing eye on the upper front leading tappered end and a hook attaching eye on the lower trailing end of said crab body, and a weight mass in said body forwardly of its center causing its center of gravity to be shifted forward and the crab body to tilt downwardly when a line attached to the lure is being reeled in.

2. An artificial bait crab-like fishing lure as claimed in claim 1 wherein said bouyant crab body is plastic coated to seal the wood or plastic buoyant mass of the lure and to give living crab like colors for reflection in the water to attract fish.

3. An artificial bait crab-like fishing lure as claimed in claim 1 wherein the buoyant crab body is of a wood which causes the body to float when cast.

4. An artificial bait crab-like as claimed in claim 1 wherein the line securing eye and hook securing eye are threaded to be secured into opposite ends of the crab body.

5. An artificial bait crab-like fishing lure as claimed in claim 4 further comprising beaded pins employed for eyes secured into the front of said wood crab body.

6. An artificial bait as claimed in claim 4 further comprising a plastic bill extending downwardly from and forwardly beneath said buoyant crab body and line attaching means extending upwardly from the top of said bill beneath the front end of said crab body.

* * * * *